US010919816B1

(12) United States Patent
Glover et al.

(10) Patent No.: US 10,919,816 B1
(45) Date of Patent: Feb. 16, 2021

(54) EPOXIDE MOISTURE BARRIER COATINGS CONTAINING THERMOPLASTIC RESINS

(71) Applicant: Surface Chemists of Florida, Inc., Jupiter, FL (US)

(72) Inventors: A. Jaeton Glover, Jupiter, FL (US); Alice P. Hudson, Jupiter, FL (US); Stefan J. Kelly, Palm Beach Gardens, FL (US); Russell Klare, Jupiter, FL (US); Cynthia Moss, Jupiter, FL (US); Matthew Taylor, Palm Beach Gardens, FL (US)

(73) Assignee: SURFACE CHEMISTS OF FLORIDA, INC., Jupiter, FL (US)

( * ) Notice: Subject to any disclaimer, the term of this patent is extended or adjusted under 35 U.S.C. 154(b) by 0 days.

(21) Appl. No.: 16/897,015

(22) Filed: Jun. 9, 2020

(51) Int. Cl.
| | | |
|---|---|---|
| *C05G 3/40* | (2020.01) | |
| *C05G 5/35* | (2020.01) | |
| *C09D 171/03* | (2006.01) | |
| *C09D 193/04* | (2006.01) | |
| *C09D 147/00* | (2006.01) | |
| *C05G 5/30* | (2020.01) | |

(52) U.S. Cl.
CPC ............ *C05G 3/40* (2020.02); *C05G 5/35* (2020.02); *C05G 5/37* (2020.02); *C05G 5/38* (2020.02); *C09D 147/00* (2013.01); *C09D 171/03* (2013.01); *C09D 193/04* (2013.01)

(58) Field of Classification Search
None
See application file for complete search history.

(56) References Cited

U.S. PATENT DOCUMENTS

| | | | |
|---|---|---|---|
| 3,223,518 A | 12/1965 | Hansen | |
| 3,252,786 A | 5/1966 | Bozzelli | |
| 3,264,088 A | 8/1966 | Hansen | |
| 3,280,215 A | 10/1966 | Severance | |
| 4,003,959 A | 1/1977 | Wada et al. | |
| 4,011,061 A | 3/1977 | Forseen et al. | |
| 4,082,533 A | 4/1978 | Wittenbrook et al. | |
| 4,089,800 A * | 5/1978 | Temple ............... | A61K 9/50 427/213.31 |
| 4,189,548 A | 2/1980 | Sakashita et al. | |
| 4,210,733 A | 7/1980 | Hayashi et al. | |
| 4,311,250 A | 1/1982 | Ravve et al. | |
| 4,749,434 A | 6/1988 | Harrison | |
| 4,969,947 A * | 11/1990 | Moore ............... | C08G 18/3278 71/28 |
| 5,137,563 A | 8/1992 | Valkanas | |
| 5,300,135 A | 4/1994 | Hudson et al. | |
| 5,423,897 A | 6/1995 | Hudson et al. | |
| 5,476,528 A | 12/1995 | Trimm et al. | |
| 5,478,375 A | 12/1995 | Hudson | |
| 5,538,531 A | 7/1996 | Hudson et al. | |
| 5,698,002 A | 12/1997 | Hudson | |
| 5,739,184 A * | 4/1998 | Marbry ............... | C08G 59/68 523/403 |
| 5,803,946 A | 9/1998 | Petcavich et al. | |
| 5,858,094 A | 1/1999 | Detrick et al. | |
| 5,984,994 A | 11/1999 | Hudson | |
| 6,231,633 B1 | 5/2001 | Hirano | |
| 6,663,686 B1 | 12/2003 | Geiger et al. | |
| 7,018,440 B2 | 3/2006 | Tabei | |
| 7,682,656 B2 | 3/2010 | Xing | |
| 8,303,680 B2 | 11/2012 | Mente | |
| 8,795,406 B2 | 8/2014 | Maruvada et al. | |
| 8,888,887 B2 | 11/2014 | Hargrove et al. | |
| 10,189,752 B2 | 1/2019 | Achille et al. | |
| 2003/0157247 A1 | 8/2003 | Chikami | |
| 2006/0115586 A1 | 6/2006 | Xing | |
| 2009/0020038 A1* | 1/2009 | Fenn ............... | C09D 193/04 106/218 |
| 2009/0020041 A1* | 1/2009 | Fenn ............... | C09D 163/00 106/287.22 |
| 2010/0307211 A1 | 12/2010 | Xing et al. | |
| 2013/0042659 A1 | 2/2013 | Beatty et al. | |
| 2014/0033779 A1 | 2/2014 | Bertin | |
| 2014/0220315 A1 | 8/2014 | Zhang et al. | |
| 2015/0376077 A1 | 12/2015 | Barr | |
| 2016/0002378 A1* | 1/2016 | Shimizu ............... | C08F 220/10 525/330.3 |
| 2016/0160064 A1 | 6/2016 | Burns et al. | |
| 2016/0297725 A1 | 10/2016 | No et al. | |
| 2018/0022661 A1* | 1/2018 | Achille ............... | C09D 175/08 71/27 |
| 2018/0371270 A1 | 12/2018 | Graunke et al. | |
| 2019/0031892 A1 | 1/2019 | Bender et al. | |

FOREIGN PATENT DOCUMENTS

WO  2007022031  2/2007

OTHER PUBLICATIONS

L.H. Sperling: Interpenetrating Polymer Networks: An Overview, American Chemical Society, May 5, 1994.
W.J. Work et al.: "Definition of terms related to polymer blends, composites, and multiphase polymeric materials (IUPAC Recommendations 2004)", Pure and Applied Chemistry, vol. 76, No. 11, pp. 1985-2007, 2004.

* cited by examiner

*Primary Examiner* — Wayne A Langel
(74) *Attorney, Agent, or Firm* — Fox Rothschild LLP

(57) ABSTRACT

A moisture barrier coating includes the reaction product of (A) at least one polyglycidyl ether resin, and (B) at least one epoxy curing agent comprising amines. The moisture barrier coating further includes at least one amorphous thermoplastic material that is nonreactive with A and with B, and that forms a homogeneous mixture with at least one of A or B. A controlled release fertilizer, a method for the production of a controlled release fertilizer, and a moisture barrier coating system are also disclosed.

21 Claims, No Drawings

EPOXIDE MOISTURE BARRIER COATINGS CONTAINING THERMOPLASTIC RESINS

FIELD OF THE INVENTION

The present invention relates to moisture barrier coatings for applications including controlled release fertilizers.

BACKGROUND OF THE INVENTION

U.S. Pat. No. 10,189,752 to Achille, et al, discloses that the addition of a mixture of an organic wax and a wax soluble polymer to one or more components of a thermoset polymer, which may form a semi-interpenetrating polymer network when the thermoset polymer is subsequently cured on the surface of a substrate, substantially improves the moisture barrier properties of the thermoset polymer. The wax is necessary to the performance, and the wax soluble polymers may or may not be soluble in a thermoset polymer component.

Epoxide polymers as coatings for controlled release fertilizer are known in the art.

U.S. Pat. No. 5,698,002 to Hudson discloses controlled release fertilizers with multiple coats, with the inner coating being an epoxide polymer.

U.S. Pat. No. 3,264,088 to Hansen discloses epoxide polymers as controlled release coatings for fertilizers.

Hydrocarbon resins are commonly added to epoxide resins used in, for example, coatings and adhesive applications.

U.S. Pat. No. 3,280,215 to Severance, et al, discloses coumarin-indene (coal tar) resins as components of epoxide polymer compositions. The resins provide a desirable balance of physical properties including good flexibility, good tensile properties and excellent corrosion resistance.

U.S. Pat. No. 4,003,959 to Wada, et al, discloses compositions for paints and sealing agents with specific cyclopentadiene containing resins added to epoxide resin and hardener mixtures and cured. The resins provide impact strength, acid resistance, alkali resistance, hot water resistance and oil resistance.

U.S. Pat. No. 4,189,548 to Sakashita, et al, discloses the addition of specific hydrocarbon resins prepared from various petroleum byproduct streams, particularly containing dicyclopentadiene, to epoxide resins cured with amine curing agents, for use in paints, adhesives, road-repairing materials, floor coverings, and similar applications.

U.S. Pat. No. 4,210,733 to Hayashi, et al, discloses a composite resinous composition comprising an epoxy resin and an aromatic hydrocarbon resin sourced from petroleum fractions produced during the thermal cracking of naphtha, kerosene or gas oil. The composite compositions have improved water resistance over the epoxide alone.

U.S. Pat. No. 4,749,434 to Harrison discloses sealant compositions for ferromagnetic surfaces which are mixtures of magnetic filler particles, a hydrocarbon resin, a tackifier resin, a plasticizer, an epoxy resin and an epoxy curing agent.

Hydrocarbon resins have been included in compositions for controlled release coatings for fertilizers.

U.S. Pat. No. 4,011,061 to Forseen, et al, discloses sustained release water soluble particles that are coated with organophilic particles and fused with a water insoluble binder which may contain a hydrocarbon resin.

U.S. Pat. No. 4,082,533 to Wittenbrook, et al, discloses the addition of hydrocarbon resins to wax sealants used on controlled release fertilizer comprising a masonry cement coating.

There is a continuing need for improvement in the nutrient use efficiency of fertilizers, to prevent environmental damage from nutrient run-off and to maximize the economic benefits of the fertilizer application. Controlling the release rate of the nutrients to adapt to the requirements of the landscape, agricultural, and horticultural targets to which the fertilizers are applied is a critical requirement for this. Thus continued improvement in the performance of controlled release fertilizers is needed.

SUMMARY OF THE INVENTION

A moisture barrier coating comprising the reaction product of:
A. at least one polyglycidyl ether resin, and
B. at least one epoxy curing agent comprising amines
and further comprising at least one amorphous thermoplastic material that is nonreactive with A and with B, and that forms a homogeneous mixture with at least one of A or B.

It has been discovered that the addition of certain amorphous thermoplastic materials herein disclosed that
(1) are nonreactive with the polyglycidyl ether resin and with the epoxy curing agent, and
(2) form homogeneous mixtures with at least one of the polyglycidyl ether resin or the epoxy curing agent
improve the performance properties of the cured thermoset epoxide polymers in applications including moisture barrier coatings for controlled release fertilizers.

DESCRIPTION OF THE PREFERRED EMBODIMENTS

In one aspect of the invention the thermoset polymer is comprised of polyepoxides comprised of the reaction product of glycidyl ether reactive amine containing curing agents and polyglycidyl ether epoxide resins.

The choice of glycidyl ether reactive amine containing curing agent is not particularly restrictive and one skilled in the art will recognize suitable curing agents. Suitable commercially available curing agents include but are not limited to polyamines and modified polyamines sold by BASF (Ludwigshafen, DE) as Versamine®, by Huntsman Corporation (Salt Lake City, Utah) as Jeffamine® and Aradur®, and by Reichhold Chemical (Durham, N.C.) as Epotuf®. Amidoamine curing agents are also suitable. Amidoamine curing agents are sold by BASF as Genamid®, by Gabriel Performance Products (Ashtabula, Ohio) as Versamid®, by Reichhold as Epotuf®, by Hexion Corporation (Columbus, Ohio) as Epikure®, and by Huntsman as Aradur®. Amine curing agents derived from cardanol and sold by Cardolite Corporation (Monmouth Junction, N.J.) as Cardolite® are also suitable. Mixtures of amine curing agent are also suitable.

The choice of polyglycidyl ether resins is not particularly restrictive and one skilled in the art will recognize suitable resins. Suitable commercially available resins include but are not limited to Epon® resins sold by Momentive Performance Products (Waterford, N.Y.), Epotuf® resins sold by Reichhold, and Araldite® resins sold by Huntsman. Epoxide resins derived from cardanol are available from Cardolite Corporation and sold as Cardolite®. Polyglycidyl ether resins based on bis-phenol A diglycidyl ether are readily available and highly suitable. Mixtures of polyglycidyl ether resins are also suitable.

Reactive diluents may be included in the epoxide formulations to improve flow characteristics and aid in the incorporation of the thermoplastic materials. Reactive diluents include mono-, di- and multifunctional glycidyl ethers which can be used to reduce the viscosity of typical polyglycidyl ether resins without causing significant changes in the final physical properties of the cured epoxy thermoset system. Suitable reactive diluents are available, for example, from Evonik Corporation (Allentown, Pa.) and sold as Epodil®, from Huntsman Corporation and sold as Araldite®, and from Gabriel Performance Products, sold as RoyOxy RAD®.

Catalysts, including boron compounds and tertiary amines, which may increase the reaction rate or decrease the optimum temperature may also be included.

The amorphous thermoplastic materials suitable in this invention are materials that 1) form a homogeneous mixture when added to at least one of the epoxide reactive curing agent or the polyglycidyl ether resin at ≤120° C., and 2) are nonreactive with the epoxide reactive curing agent and with the polyglycidyl ether resin.

Nonreactive thermoplastic additives are additives that when employed in the compositions of this invention do not react sufficiently with the polyepoxide reactive components to affect the curing reaction of the polyepoxide or the properties of the polyepoxide polymer. Thus any reactive functionality that is present in the chemical structure of the thermoplastic materials of this invention will potentially react with less than about 5 percent of the reactive groups on either the polyglycidyl ether reactant or the epoxide reactive amine curing agent, under the conditions of the processes of this invention. The nonreactive thermoplastic materials can react with 0, 0.5, 1, 1.5, 2, 2.5, 3, 3.5, 4, 4.5 or 5 percent of the reactive groups on either the polyglycidyl ether reactant or the epoxide reactive amine curing agent, or within a range of any high value and low value selected from these values.

Suitable thermoplastic additives may be materials that are components of adhesives, to which they may provide improved adhesion, and may also provide improved moisture barrier properties.

In one aspect of the invention the thermoplastic additives are materials typically sold as tackifiers.

Tackifiers are low-molecular weight oligomers that are added to adhesive formulations to improve tack and peel adhesion. Their glass transition temperature ($T_g$) may be higher than that of the base polymer but their molecular weight is much lower. The tackifiers disperse in the polymer matrix and break up their structure and thereby enhance the mobility and tack of the base polymer. They may also provide functionality that promotes specific adhesion.

The three most common groups of tackifiers are hydrocarbon resins, rosin esters, and polyterpenes.

Hydrocarbon resins are amorphous thermoplastic polymers produced by polymerization of unsaturated hydrocarbons. The feedstock may be various by-products of naphtha crackers. These resins have typically a low molecular weight ranging from about 400 to 5000 g/mol. The three main types are resins polymerized from C5 monomers, resins polymerized from C9 aromatic monomers and resins polymerized from dicyclopentadiene (DCPD) cycloaliphatic monomers. Copolymers of these monomers are also commonly available. They may be hydrogenated to reduce discoloration and to improve their heat and UV stability.

C5 monomers include but are not limited to cis/trans 1,3-pentadienes, 2-methyl-2-butene, cyclopentene, and cyclopentadiene. Suitable commercially available C5 aliphatic resins that may be polymers and copolymers of C5 aliphatic monomers and other hydrocarbon monomers include, for example, resins available from Cray Valley (Exton, Pa.) sold as Wingtack®, resins available from Rezkem (Hudson, Ohio) sold as Alphatac®, resins available from Neville Chemical Company (Pittsburgh, Pa.) sold as Nevpene®, resins available from ExxonMobil (Irving, Tex.), sold as Escorez®, and resins available from Eastman Chemical Company (Kingsport, Tenn.), sold as Piccotac®.

C9 aromatic monomers include but are not limited to indene, methylindenes, styrene, alpha-methylstyrene and various vinyl toluenes. Suitable commercially available C9 resins that may be polymers and copolymers of C9 monomers and other hydrocarbon monomers include, for example, resins available from Rezkem sold as Arotac®, resins available from Neville sold as NP-10®, and NP-25®, Nevpene® and Nevex®, resins available from ExxonMobil sold as Escorez®, resins available from Kraton (Houston, Tex.) sold as Sylvares®, and resins available from Eastman, sold as Kristalex®, Picco®, and Piccotex®.

Dicyclopentadiene homopolymer and copolymer resins are available, for example, from Eastman as Regalite® resins, and from Rezkem as Alphatac® resins.

Rosin, also called rosin acid, is a natural occurring resin derived from pine and spruce trees. Unlike hydrocarbon resins, rosin is not a polymer but a complex mixture of high molecular weight acidic molecules including abietic and pimaric type acids. The three most important types are gum rosin, wood rosin, and tall oil rosin. Gum rosin is the exudate of plants and trees. Commercial gum rosin is harvested from pine trees by periodically wounding the tree and collecting the sap. Wood rosin is harvested from the stump of pine trees by multiple extraction and distillation. Tall oil rosin is a by-product of the Kraft process of wood pulp manufacture when pulping pine trees, and when distilled has properties similar to wood and gum rosin.

To improve their oxidative stability they are often treated by disproportionation and hydrogenation. To improve compatibility in their applications they are typically converted to esters. Important esters include glycerol, methyl triethylene glycol, and pentaerythritol esters. Commercially available rosin based products include for example products available from Eastman Chemical Company (Kingsport, Tenn.) and sold under the trade names Abitol®, Dymerex®, Foral®, Foralyn®, Pentalyn®, Permalyn®, Poly-Pale®, and Staybelite®; products available from Teckrez (Jacksonville, Fla.) and sold under the trade name Teckroz®; products available from Ingevity (North Charleston, S.C.) sold under the trade names Altatac® and WestRez®; and products available from Kraton sold under the trade names Sylvatac® and Sylvalite®. Tall oil pitch, which is the residue from the distillation of tall oil and contains primarily high-boiling esters of fatty acids and rosin, and may also contain neutral materials, free fatty acids and rosin acids is also suitable. It is available for example from Ingevity.

Polyterpenes are polymers based on naturally occurring terpene chemistries, of which commercially important products include products based on α-pinene, β-pinene, and d-limonene. For commercial resin applications, terpenes are usually further modified or polymerized. The three most important types of commercial terpene resins are pinene-based polyterpene and styrene- and phenol-modified polyterpene. Commercially available polyterpenes and modified polyterpenes include but are not limited to products available from Kraton and sold under the trade name Sylvares® and products available from Ingevity and sold under the trade name Altastick®.

The moisture barrier coatings of this invention may be applied to any substrate where such a coating may be beneficial. In one aspect of this invention the coatings are applied to commercial particulate fertilizer particles to provide a controlled release benefit.

Commercial particulate fertilizers are produced and marketed in several different particle types, e.g., granular, pelletized, and prilled fertilizers. Also they may be formed of inorganic substances, organic substances, or combinations thereof. The moisture barrier coatings of this invention can be applied to any of these. To be effective in promoting plant growth, fertilizers must contain some amount of water soluble plant nutrients, typically in the form of water soluble compounds of nitrogen, phosphorus and potassium, alone or in combination and often in conjunction with other elements, e.g., calcium, boron, magnesium, zinc, chlorine, etc. Such particulate fertilizers can be made of a single component, e.g., urea, ammonium nitrate, potassium chloride, etc., or of multiple components often mixed with inert water soluble or water insoluble materials as in common fertilizers designated 6–6–6, 4–6–4, 10-10-10, 20-20-5, 14-16-0, 5-20-20, and the like. In addition, specialized fertilizers may contain optional additives such as herbicides, insecticides, trace elements, iron salts, etc. The coatings of this invention can be applied to any of these.

The mixtures of amorphous thermoplastic materials and the polyamine curing agent or polyglycidyl ether resin components are prepared by mixing the components with heating and agitation sufficient to produce homogeneous mixtures. Typically the mixtures are heated to a temperature at which the viscosity of the thermoplastic materials is reduced adequately to allow mixing with the polyglycidyl ether resin or the amine curing agent. The thermoplastic materials are chosen to form homogeneous mixtures in at least one of the epoxide components and to be nonreactive with the epoxide components at temperatures below about 80° C. and preferably below about 120° C. The thermoplastic materials may be premixed with only one of the polyamine curing agent or polyglycidyl ether resin components, or they may be premixed with both of the components, before the components are applied to the fertilizer particles.

The epoxide coating components containing the thermoplastic materials of this invention may be applied to the fertilizer particles by any methods and under any conditions that allow for 1) intimate mixing of the reactive components, one or both of which may contain the thermoplastic materials, 2) uniform spreading of the resulting mixtures onto the fertilizer particle surfaces, and 3) the reaction of the reactive components to form a polymerized epoxy polymer blend with the thermoplastic material that uniformly and completely encompasses the fertilizer particles.

Suitable fertilizer coating methods include but are not limited to:

Method A

The thermoplastic material is dispersed into a polyamine curing agent, forming a homogeneous mixture as previously described. The fertilizer particles to be coated are preheated to a temperature typically between about 50 and about 90° C., in a mixing device that provides thorough low shear agitation. The temperature is chosen based on factors including the heat stability of the fertilizer to be coated, the temperature dependent flow characteristics of the epoxy components and mixtures with the thermoplastic material, and the temperature dependence of the reaction rate of the polyamine curing agent with the polyglycidyl ether resin. One skilled in the art will choose a temperature that allows the components to spread and mix on the fertilizer particles, and also allows the reaction to proceed at a rate conducive to both complete mixing of the components before the viscosity increase from the reaction prevents further mixing and spreading, and considers the requirements for economical production rates. The mixture of polyamine curing agent and thermoplastic material is applied to the fertilizer granules and the mixing action facilitates spreading the mixture uniformly onto the granules. A polyglycidyl ether resin component is added such that the ratio of N—H functionality on the polyamine curing agent and the glycidyl ether moieties is between about 0.8 to 1 and about 1.2 to 1, and is preferably about 1 to 1. Preferably the polyglycidyl ether resin component is added concurrently with the mixture of polyamine curing agent and thermoplastic material. The polyglycidyl ether resin is allowed to spread and mix and react with the mixture of polyamine curing agent and thermoplastic material, forming a polyepoxide that incorporates the thermoplastic material into the thermoset polyepoxide polymer. The addition of the mixture of polyamine curing agent and thermoplastic material and the polyglycidyl ether resin can be repeated until the desired coating weight and controlled release properties are achieved. Typically each coating layer is from about 0.5 percent to about 2 percent by weight of the fertilizer particles and the total coating weight is from about 1 percent to about 10 percent by weight of the coated fertilizer particles. The coated fertilizer particles are cooled to ambient temperature preferably with gentle agitation. Alternatively a wax based sealant may be applied to the particles prior to the cooling step by adding the sealant as a molten liquid or as small particles in the form of for example flakes or prills. The sealant is typically added at between about 0.2 and 2 percent by weight of the fertilizer particles. The use of wax sealants on variously coated fertilizers is well known in the art. The sealants typically comprise petroleum waxes, synthetic waxes, natural waxes, and mixtures of waxes with various wax soluble additives. Suitable wax compositions are described in for example U.S. Pat. Nos. 5,300,135, 5,423, 897, 5,478,375, and 5,984,994, incorporated herein by reference.

Method B

The thermoplastic material is dispersed into a polyamine curing agent, forming a homogeneous mixture, and the mixture is cooled to ambient temperature. The fertilizer particles to be coated are preheated to a temperature typically between about 50 and about 90° C., in a mixing device that provides thorough low shear agitation. The cooled mixture of polyamine curing agent and thermoplastic material is further mixed with the polyglycidyl ether resin such that the ratio of N—H functionality on the polyamine curing agent and the glycidyl ether moieties is between about 0.8 to 1 and about 1.2 to 1, and is preferably about 1 to 1. Mixing of the polyepoxy components may be carried out in an inline mixing device incorporated into the coating production equipment. The mixture is immediately applied to the preheated fertilizer granules and the mixing action facilitates spreading the mixture uniformly onto the granules, which when cured forms a polymer that incorporates the thermoplastic material into the thermoset polyepoxide polymer. The addition of the amine thermoplastic material mixture and the polyglycidyl ether resin can be repeated until the desired coating weight and controlled release properties are achieved. Typically each coating layer is from about 0.5 percent to about 2 percent by weight of the fertilizer particles and the total coating weight is from about 1 percent to about 10 percent by weight of the coated fertilizer particles. The coated fertilizer particles are cooled to ambient temperature preferably with gentle agitation. Alternatively a wax based sealant may be applied to the particles prior to the cooling step by adding the sealant as a molten liquid or as small particles in the form of for example flakes or prills.

Method C

The thermoplastic material is dispersed into a polyglycidyl ether resin, forming a homogeneous mixture, and cooled to ambient temperature. The fertilizer particles to be coated are preheated typically between about 50 and about 90° C., in a mixing device that provides thorough low shear agitation. The cooled mixture of polyglycidyl ether resin and thermoplastic material is mixed with the polyamine curing agent such that the ratio of N—H functionality on the amine and the glycidyl ether moieties is between about 0.8 to 1 and about 1.2 to 1, and is preferably about 1 to 1. Mixing may be carried out in an inline mixing device incorporated into the coating production equipment. The mix of polyamine curing agent and mixture of polyglycidyl ether resin and thermoplastic material is immediately applied to the fertilizer granules and the mixing action facilitates spreading the mixture uniformly onto the granules. The polyglycidyl ether resin reacts with the polyamine curing agent, forming a polymer that incorporates the thermoplastic material into the thermoset polyepoxide polymer. The addition of the polyamine curing agent and the polyglycidyl ether resin and thermoplastic material mixture can be repeated until the desired coating weight and controlled release properties are achieved. Typically each coating layer is from about 0.5 percent to about 2 percent by weight of the fertilizer particles and the total coating weight is from about 1 percent to about 10 percent by weight of the fertilizer particles. The coated fertilizer particles are cooled to ambient temperature preferably with gentle agitation. Alternatively a wax based sealant may be applied to the particles prior to the cooling step by adding the sealant as a molten liquid or as small particles in the form of for example flakes or prills.

Method D

The thermoplastic material is dispersed into a polyglycidyl ether resin, forming a homogeneous mixture. The fertilizer particles to be coated are preheated typically to between about 50 and about 90° C., in a mixing device that provides thorough low shear agitation. The mixture of polyglycidyl ether resin and thermoplastic material is applied to the fertilizer granules and the mixing action facilitates spreading the mixture uniformly onto the granules. A polyamine curing agent is added such that the ratio of N—H functionality on the polyamine curing agent and the glycidyl ether moieties is between about 0.8 to 1 and about 1.2 to 1, and is preferably about 1 to 1. Preferably the polyamine curing agent is added concurrently with the mixture of polyglycidyl ether resin and thermoplastic material. The polyamine curing agent is allowed to spread and mix and react with the mixture of polyglycidyl ether resin and thermoplastic material, forming a polyepoxide that incorporates the thermoplastic material into the thermoset polyepoxide polymer. The addition of the polyglycidyl ether resin and thermoplastic material mixture and the polyamine curing agent and can be repeated until the desired coating weight and controlled release properties are achieved. Typically each coating layer is from about 0.5 percent to about 2 percent by weight of the fertilizer particles and the total coating weight is from about 1 percent to about 10 percent by weight of the coated fertilizer particles. The coated fertilizer particles are cooled to ambient temperature preferably with gentle agitation. Alternatively a wax based sealant may be applied to the particles prior to the cooling step by adding the sealant as a molten liquid or as small particles in the form of for example flakes or prills.

Method E

In still another mode of carrying out the invention, the thermoplastic material is dispersed into a glycidyl ether containing reactive diluent which is then mixed with a polyglycidyl ether resin, or alternatively the thermoplastic material is dispersed into a mixture of reactive diluent and polyglycidyl ether resin, forming a homogeneous mixture. The amount of reactive diluent is chosen so that the percent by weight in the final polyepoxide coating composition is from about 1 to about 20 percent by weight. The mixture of reactive diluent, thermoplastic material, and polyglycidyl ether resin is then incorporated into the fertilizer coating procedure as described in methods C and D above, replacing the mixture of thermoplastic material and polyglycidyl ether resin described therein.

The level of thermoplastic material added as a weight percent of the epoxide coating composition is chosen based on considering the viscosity of the mixtures of the material with the polyamine curing agent or the polyglycidyl ether resin with or without a glycidyl ether reactive diluent, the dependence of the performance of the moisture barrier coating material on the addition level, and the limits of the compatibility of the thermoplastic material in the cured epoxy polymer. The weight ratio of the thermoplastic material to the polyepoxide polymer can be 70:30, 69:31, 68:32, 67:33, 66:34, 65:35, 64:36, 63:37, 62:38, 61:39, 60:40, 59:41, 58:42, 57:43, 56:44, 55:45, 54:46, 53:47, 52:48, 51:49, 50:50, 49:51, 48:52, 47:53, 46:54, 45:55, 44:56, 43:57, 42:58, 41:59, 40:60, 39:61, 38:62, 37:63, 36:64, 35:65, 34:66, 33:67, 32:68, 31:69, 30:70, 29:71, 28:72, 27:73, 26:74, 25:75, 24:76, 23:77, 22:78, 21:79, 20:80, 19:81, 18:82, 17:83, 16:84, 15:85, 14:86, 13:87, 12:88, 11:89, 10:90, 9:91, 8:92, 7:93, 6:94, 5:95, 4;96, 3:97, 2:98, or 1:99, or within a range of any high and low ratio of these values.

Preferably the thermoplastic material is from about 2 percent to about 50 percent of the polyepoxide coating composition containing the thermoplastic, and most preferably from about 5 percent to about 30 percent of the polyepoxide coating composition containing the thermoplastic material.

Without being bound by theory, the compositions of the cured epoxy polymers containing the thermoplastic material produced by the methods described above may be described as polymer blends as defined in Pure Appl. Chem., Vol. 76, No. 11, pp. 1985-2007, 2004. Thus they exhibit macroscopically uniform physical properties throughout their volume. The thermoplastic materials and the epoxy resins may or may not be miscible, and the macroscopically uniform physical properties are typically caused by sufficiently strong interactions between the component polymers.

The suitability of the thermoplastic materials for the compositions of this invention may be evaluated by the following methods:

To determine whether the thermoplastic materials form homogeneous mixtures with either the polyglycidyl ether resin, the polyglycidyl ether resin mixed with a reactive diluent, or with the polyamine curing agent, the following method may be used:

1. To a 150 ml beaker charge 50 g of the polyglycidyl ether resin, the polyglycidyl ether resin mixed with a reactive diluent, or the polyamine curing agent. Place the beaker on a hot plate and stir with an overhead mixer while monitoring the temperature of the beaker contents.

2. When the target temperature is reached add the targeted amount of the thermoplastic material and stir, maintaining the temperature, until the material has melted and dispersed into the epoxy component.

3. Discontinue stirring and continue to hold the mixture at the target temperature while observing the physical behavior. Note whether 1) the mixture is a clear solution, or 2) the mixture is a homogeneous dispersion that remains stable, or 3) the mixture forms two phases on standing.

4. Cool the mixture to ambient temperature and observe the physical form as in step 3.

To determine whether materials that were found to form homogeneous mixtures with at least one epoxy component will form a polymer blend on curing the epoxide in the application, the following method may be used:

1. A quantity of the polymer component (the polyglycidyl ether resin, the polyglycidyl ether resin mixed with a reactive diluent, or the polyamine curing agent) mixed with the thermoplastic material that was formed by the mixing procedure described above sufficient to form 10 g of cured material is charged to a 2 inch diameter aluminum dish at ambient temperature.

2. A quantity of the second component of the epoxide polymer sufficient to form an approximately 1:1 ratio of epoxide to N—H functionality mixture is added and the components are thoroughly mixed at ambient temperature.

3. The aluminum dish with the mixture is placed in an oven at 80° C. for 1 hour to cure. It is then removed from the oven and allowed to cool to ambient temperature.

4. The cured polymer containing the thermoplastic material is observed to determine whether the thermoplastic material has formed a macroscopically uniform composition with the epoxide polymer, or has formed a physically separated phase from the cured epoxide polymer.

To determine the controlled release properties of the coated urea products the following method may be used:

10 g of the coated products is dispersed in 90 g of water and stored at a constant temperature, typically 38° C. At selected intervals the mixture is gently stirred and the urea that has released from the granules is determined by quantifying the urea in the water phase by measuring the refractive index, which is linear with the urea concentration in the solution.

The following examples further illustrate the invention. As used herein all parts or percentages are by weight of the entire composition unless otherwise indicated.

In the examples the following materials are used:

| Reagent | Description | Company | Location |
|---|---|---|---|
| Arotac ® 100 | C9 Hydrocarbon tackifying resin | Rezkem Chemicals, LLC | Hudson, OH |
| Arotac ® 100MA | Aliphatic modified aromatic tackifying resin | Rezkem Chemicals, LLC | Hudson, OH |
| Tallex ® | Tall oil pitch | Ingevity | N. Charleston, SC |
| Sylvatac ® RE 98 | Rosin ester tackifier, pentaerythritol ester | Kraton Chemical, LLC | Houston, TX |
| Sylvalite ® RE 85GB | Rosin ester tackifier, glycerol ester | Kraton Chemical, LLC | Houston, TX |
| Sylvalite ® 2038 | Rosin ester tackifier, mixed ester | Kraton Chemical, LLC | Houston, TX |
| Uni-tac ® 70 | Modified rosin tackifier, formaldehyde modified | Kraton Chemical, LLC | Houston, TX |
| Sylvares ® TR A25L | Polyterpene tackifying resin, alpha-pinene based | Kraton Chemical, LLC | Houston, TX |
| Sylvares ® TP 96 | Terpene phenolic resin | Kraton Chemical, LLC | Houston, TX |
| EPON ® 828 | Polyglycidyl ether epoxide resin | Hexion Inc. | Columbus, OH |
| Epodil ® 746 | Monofunctional reactive diluent | Evonik Corporation | Allentown, PA |
| Cardolite ® NC-514 | Cardanol derived polyglycidyl ether | Cardolite Corporation | Newark, NJ |
| Epikure ® 3140 | Amidoamine curing agent | Hexion Inc. | Columbus, OH |
| Polycat ® 9 | Tertiary amine catalyst | Evonik | Allentown, PA |
| Curing Agent | 95/5 w/w mixture of Epikure ® 3140 and Polycat ® 9 | | |
| AlphaPlus ® C30+ | Alpha olefin wax | Chevron Phillips Chemical Company | The Woodlands, TX |

Example 1

57.03 g of EPON® 828 and 4.84 g of Arotac® 100 were combined and vigorously mixed at 120° C. until a clear homogenous mixture formed.

500 g of −6/+10 mesh urea granules were charged to a rotating drum mixer, heated to 80-85° C., and maintained at this temperature. 3.58 g of the EPON® 828-Arotac® 100 mixture prepared above was mixed with 2.03 g of Curing Agent, and the mixture was immediately added to the urea granules. Agitation was continued for 15 minutes at which point the mixing and addition of the polymer components was repeated. The agitation was continued for 15 minutes until the granules were free flowing. The total coating was 2 percent by weight of the coated urea, and the Arotac® 100 was 5 percent by weight of the coating.

Example 2

62.62 g of EPON® 828 and 5.61 g of Arotac® 100MA were combined and vigorously mixed at 120° C. until a clear homogenous mixture formed.

500 g of −6/+10 mesh urea granules were charged to a rotating drum mixer, heated to 80-85° C., and maintained at this temperature. 3.58 g of the EPON® 828-Arotac® 100MA mixture prepared above was mixed with 2.03 g of Curing Agent, and the mixture was immediately added to the urea granules. Agitation was continued for 15 minutes at which point the mixing and addition of the polymer components was repeated. The agitation was continued for 15 minutes until the granules were free flowing. The total coating was 2 percent by weight of the coated urea, and the Arotac® 100MA was 5 percent by weight of the coating

Example 3

35.1 g of Curing Agent and 4.9 g of Tallex® were combined and vigorously mixed at 85° C. until a clear homogenous mixture formed.

500 g of −6/+10 mesh urea granules were charged to a rotating drum mixer, heated to 80-85° C., and maintained at this temperature. 2.31 g of the Curing Agent-Tallex® mixture prepared above was mixed with 3.30 g of EPON® 828, and the mixture was immediately added to the urea granules. Agitation was continued for 15 minutes at which point the mixing and addition of the polymer components was repeated. The agitation was continued for 15 minutes until the granules were free flowing. The total coating was 2 percent by weight of the coated urea, and the Tallex® was 5 percent by weight of the coating.

Example 4

9.22 g of EPON® 828 and 0.78 g of Sylvatac® RE 98 were combined and vigorously mixed at 120° C. until a clear homogenous mixture formed.

500 g of −6/+10 mesh urea granules were charged to a rotating drum mixer, heated to 80-85° C., and maintained at this temperature. 3.58 g of the EPON® 828-Sylvatac® RE 98 mixture prepared above was mixed with 2.03 g of Curing Agent, and the mixture was immediately added to the urea granules. Agitation was continued for 15 minutes at which point the mixing and addition of the polymer components was repeated. The agitation was continued for 15 minutes until the granules were free flowing. The total coating was 2 percent by weight of the coated urea, and the Sylvatac® RE 98 was 5 percent by weight of the coating.

Example 5

9.23 g of EPON® 828 and 0.78 g of Sylvalite® RE 85 GB were combined and vigorously mixed at 120° C. until a clear homogenous mixture formed.

500 g of −6/+10 mesh urea granules were charged to a rotating drum mixer, heated to 80-85° C., and maintained at this temperature. 3.58 g of the EPON® 828-Sylvalite® RE 85 GB mixture prepared above was mixed with 2.03 g of Curing Agent, and the mixture was immediately added to the urea granules. Agitation was continued for 15 minutes at which point the mixing and addition of the polymer components was repeated. The agitation was continued for 15 minutes until the granules were free flowing. The total coating was 2 percent by weight of the coated urea, and the Sylvalite® RE 85 GB was 5 percent by weight of the coating.

Example 6

9.23 g of EPON® 828 and 0.78 g of Sylvalite® 2038 were combined and vigorously mixed at 100° C. until a clear homogenous mixture formed.

500 g of −6/+10 mesh urea granules were charged to a rotating drum mixer, heated to 80-85° C., and maintained at this temperature. 3.58 g of the EPON® 828-Sylvalite® 2038 mixture prepared above was mixed with 2.03 g of Curing Agent, and the mixture was immediately added to the urea granules. Agitation was continued for 15 minutes at which point the mixing and addition of the polymer components was repeated. The agitation was continued for 15 minutes until the granules were free flowing. The total coating was 2 percent by weight of the coated urea, and the Sylvalite® 2038 was 5 percent by weight of the coating.

Example 7

9.22 g of EPON® 828 and 0.78 g of Uni-tac® 70 were combined and vigorously mixed at 110° C. until a clear homogenous mixture formed.

500 g of −6/+10 mesh urea granules were charged to a rotating drum mixer, heated to 80-85° C., and maintained at this temperature. 3.58 g of the EPON® 828-Uni-tac® 70 mixture prepared above was mixed with 2.03 g of Curing Agent, and the mixture was immediately added to the urea granules. Agitation was continued for 15 minutes at which point the mixing and addition of the polymer components was repeated. The agitation was continued for 15 minutes until the granules were free flowing. The total coating was 2 percent by weight of the coated urea, and the Uni-tac® 70 was 5 percent by weight of the coating.

Example 8

8.79 g of Curing Agent and 1.22 g of Sylvares® TR A25L were combined and vigorously mixed at 70° C. until a clear homogenous mixture formed.

500 g of −6/+10 mesh urea granules were charged to a rotating drum mixer, heated to 80-85° C., and maintained at this temperature. 2.31 g of the Curing Agent-Sylvares® TR A25L mixture prepared above was mixed with 3.30 g of EPON® 828, and the mixture was immediately added to the urea granules. Agitation was continued for 15 minutes at which point the mixing and addition of the polymer components was repeated. The agitation was continued for 15 minutes until the granules were free flowing. The total coating was 2 percent by weight of the coated urea, and the Sylvares® TR A25L was 5 percent by weight of the coating.

Example 9

8.78 g of Curing Agent and 1.22 g of Sylvares® TP 96 were combined and vigorously mixed at 77° C. until a clear homogenous mixture formed.

500 g of −6/+10 mesh urea granules were charged to a rotating drum mixer, heated to 80-85° C., and maintained at this temperature. 2.31 g of the Curing Agent-Sylvares® TP 96 mixture prepared above was mixed with 3.30 g of EPON® 828, and the mixture was immediately added to the urea granules. Agitation was continued for 15 minutes at which point the mixing and addition of the polymer components was repeated. The agitation was continued for 15 minutes until the granules were free flowing. The total coating was 2 percent by weight of the coated urea, and the Sylvares® TP 96 was 5 percent by weight of the coating.

Example 10 (Comparative)

500 g of −6/+10 mesh urea granules were charged to a rotating drum mixer, heated to 80-85° C., and maintained at this temperature. 3.48 g of EPON® 828 was mixed with 2.13 g of Curing Agent, and the mixture was immediately added to the urea granules. Agitation was continued for 15 minutes at which point the mixing and addition of the polymer components was repeated. The agitation was continued for 15 minutes until the granules were free flowing. The total coating was 2 percent by weight of the coated urea.

To determine the controlled release properties of the coated urea products of Examples 1, 2, 3, 4, 5, 6, 7, 8, 9, and 10, 10 g of the coated urea were dispersed in 90 g of water and stored at 38° C. for 7 days. The urea that had released from the granules was determined by quantifying the urea in the water phase by refractive index. The results are shown in Table 1:

TABLE 1

| Example | Thermoplastic | 7 day release |
| --- | --- | --- |
| 1 | 5% Arotac ® 100 | 91% |
| 2 | 5% Arotac ® 100MA | 90% |
| 3 | 5% Tallex ® | 83% |
| 4 | 5% Sylvalite ® RE 98 | 91% |
| 5 | 5% Sylvalite ® RE 85GB | 89% |
| 6 | 5% Sylvalite ® 2038 | 88% |
| 7 | 5% Uni-tac ® 70 | 91% |
| 8 | 5% Sylvares ® TR A25L | 78% |
| 9 | 5% Sylvares ® TP 96 | 82% |
| 10 (comparative) | None | 92% |

Example 11

60.58 g of EPON® 828 and 10.87 g of Sylvalite® 2038 were combined and vigorously mixed at 100° C. until a clear homogenous mixture formed.

500 g of −6/+10 mesh urea granules were charged to a rotating drum mixer, heated to 80-85° C., and maintained at this temperature. 3.69 g of the EPON® 828-Sylvalite® 2038 mixture prepared above was mixed with 1.92 g of Curing Agent, and the mixture was immediately added to the urea granules. Agitation was continued for 15 minutes at which point the mixing and addition of the polymer components was repeated. The agitation was continued for 15 minutes until the granules were free flowing. The total coating was 2 percent by weight of the coated urea, and the Sylvalite® 2038 was 10 percent by weight of the coating.

Example 12

28.5 g of EPON® 828 and 11.5 g of Sylvalite® 2038 were combined and vigorously mixed at 85° C. until a clear homogenous mixture formed.

500 g of −6/+10 mesh urea granules were charged to a rotating drum mixer, heated to 80-85° C., and maintained at this temperature. 3.90 g of the EPON® 828-Sylvalite 2038 mixture prepared above was mixed with 1.71 g of Curing Agent, and the mixture was immediately added to the urea granules. Agitation was continued for 15 minutes at which point the mixing and addition of the polymer components was repeated. The agitation was continued for 15 minutes until the granules were free flowing. The total coating was 2 percent by weight of the coated urea, and the Sylvalite® 2038 was 20 percent by weight of the coating.

Example 13

15.3 g of EPON® 828 and 24.7 g of Sylvalite® 2038 were combined and vigorously mixed at 85° C. until a clear homogenous mixture formed.

500 g of −6/+10 mesh urea granules were charged to a rotating drum mixer, heated to 80-85° C., and maintained at this temperature. 4.54 g of the EPON® 828-Sylvalite® 2038 mixture prepared above was mixed with 1.07 g of Curing Agent, and the mixture was immediately added to the urea granules. Agitation was continued for 15 minutes at which point the mixing and addition of the polymer components was repeated. The agitation was continued for 15 minutes until the granules were free flowing. The total coating was 2 percent by weight of the coated urea, and the Sylvalite® 2038 was 50 percent by weight of the coating.

To determine the controlled release properties of the coated urea products of Examples 6, 11, 12, and 13, 10 g of the coated urea were dispersed in 90 g of water and stored at 38° C. for 7 days. The urea that had released from the granules was determined by quantifying the urea in the water phase by refractive index. The results are shown in Table 2:

TABLE 2

| Example | % Sylvalite ® 2038 | 7 day release |
| --- | --- | --- |
| 6 | 5 | 88% |
| 11 | 10 | 87% |
| 12 | 20 | 82% |
| 13 | 50 | 100% |

Example 14

26 g of EPON® 828 and 14 g of Arotac® 100 were combined and vigorously mixed at 100° C. until a clear homogenous mixture formed. 2.1 g of Epodil® 746 was added and mixing continued until a clear mixture formed.

500 g of −6/+10 mesh urea granules were charged to a rotating drum mixer, heated to 80-85° C., and maintained at this temperature. 3.98 g of the EPON® 828-Arotac® 100-Epodil® 746 mixture prepared above was mixed with 1.63 g of Curing Agent, and the mixture was immediately added to the urea granules. Agitation was continued for 15 minutes at which point the mixing and addition of the polymer components was repeated. The agitation was continued for 15 minutes until the granules were free flowing. The total coating was 2 percent by weight of the coated urea, and the Arotac® 100 was 23.5 percent by weight of the coating.

To determine the controlled release properties of the coated urea products of Examples 1, 10, and 14, 10 g of the coated urea were dispersed in 90 g of water and stored at 38° C. for 7 days. The urea that had released from the granules was determined by quantifying the urea in the water phase by refractive index. The results are shown in Table 3:

TABLE 3

| Example | % Arotac ® 100 | % Epodil ® 746 | 7 day release |
| --- | --- | --- | --- |
| 1 | 5 | 0 | 91% |
| 10 (comparative) | 0 | 0 | 92% |
| 14 | 23.5 | 3.5 | 85% |

Example 15

37.5 g of Cardolite® NC-514 and 2.5 g of Sylvares® TR A25L were combined and vigorously mixed at 85° C. until a clear homogenous mixture formed.

500 g of −6/+10 mesh urea granules were charged to a rotating drum mixer, heated to 80-85° C., and maintained at this temperature. 4.54 g of the Cardolite® NC-514-Sylvares® TR A25L mixture prepared above was mixed with 1.07 g of Curing Agent, and the mixture was immediately added to the urea granules. Agitation was continued for 15 minutes at which point the mixing and addition of the polymer components was repeated. The agitation was continued for 15 minutes until the granules were free flowing upon cooling. The total coating was 2 percent by weight of the coated urea, and the Sylvares® TR A25L was 5 percent by weight of the coating.

Example 16

35.1 g of Curing Agent and 4.9 g of Uni-tac® 70 were combined and vigorously mixed at 85° C. until a clear homogenous mixture formed.

35.1 g of Curing Agent and 4.9 g of Sylvares® TP 96 were combined and vigorously mixed at 85° C. for until a clear homogenous mixture formed.

500 g of −6/+10 mesh urea granules were charged to a rotating drum mixer, heated to 80-85° C., and maintained at this temperature. 1.155 g of the Curing Agent-Uni-tac® 70 mixture prepared above, 1.155 g of the Curing Agent-Sylvares® TP 96 mixture prepared above, and 3.60 g of EPON® 828 were mixed and the mixture was immediately added to the urea granules. Agitation was continued for 15 minutes at which point the mixing and addition of the polymer components was repeated. The agitation was continued for 15 minutes until the granules were free flowing. The total coating was 2 percent by weight of the coated urea, and the Uni-tac® 70 and Sylvares® TP96 were each 2.5 percent by weight of the coating.

To determine the controlled release properties of the coated urea products of Examples 7, 9, and 16, 10 g of the coated urea were dispersed in 90 g of water and stored at 38° C. for 7 days. The urea that had released from the granules was determined by quantifying the urea in the water phase by refractive index. The results are shown in Table 4:

TABLE 4

| Example | % Uni-tac ® 70 | % Sylvares ® TP 96 | 7 day release |
|---|---|---|---|
| 7 | 5 | 0 | 91% |
| 9 | 0 | 5 | 82% |
| 16 | 2.5 | 2.5 | 84% |

Example 17

300 g of the coated urea product of Example 1 were charged to a rotating drum mixer, heated to 80-85° C., and maintained at this temperature. 3.3 g of AlphaPlus® C30+ was added to the coated urea granules. Agitation was continued for 10 minutes. External heating was removed, and granules were allowed to cool while mixing for 10 minutes. Granules were free flowing. The total wax coating was 1 percent by weight of the coated urea.

To determine the controlled release properties of the coated urea products of Examples 1 and 17, 10 g of the coated urea products were dispersed in 90 g of water and stored at 38° C. for 7 days. The urea that had released from the granules was determined by quantifying the urea in the water phase by refractive index. The results are shown in Table 5:

TABLE 5

| Example | % Arotac ® 100 | Sealant | 7 day release |
|---|---|---|---|
| 1 | 5 | None | 91% |
| 17 | 5 | 1% AlphaPlus ® C30+ | 38% |

Example 18

36.88 g of EPON® 828 and 3.12 g of Sylvatac® RE 98 were combined and vigorously mixed at 120° C. until a clear homogenous mixture formed.

500 g of −6/+10 mesh urea granules were charged to a rotating drum mixer, heated to 80-85° C., and maintained at this temperature. 3.58 g of the EPON® 828-Sylvatac® RE 98 mixture prepared above were added to the urea. 2.03 g of Curing Agent were then added to the urea granules. Agitation was continued for 15 minutes at which point the mixing and addition of the polymer components was repeated. The agitation was continued for 15 minutes until the granules were free flowing. The total coating was 2 percent by weight of the coated urea, and the Sylvatac® RE 98 was 5 percent by weight of the coating.

Example 19

500 g of −6/+10 mesh urea granules were charged to a rotating drum mixer, heated to 80-85° C., and maintained at this temperature. 2.03 g of the Curing Agent was added to the urea granules. 3.58 g of EPON® 828-Sylvatac® RE 98 mixture from Example 18 were then added to the urea granules. Agitation was continued for 15 minutes at which point the mixing and addition of the polymer components was repeated. The agitation was continued for 15 minutes until the granules were free flowing. The total coating was 2 percent by weight of the coated urea, and the Sylvatac® RE 98 was 5 percent by weight of the coating.

To determine the controlled release properties of the coated urea products of Examples 4, 9, 14, 18, and 19, 10 g of the coated urea products were dispersed in 90 g of water and stored at 38° C. for 7 days. The urea that had released from the granules was determined by quantifying the urea in the water phase by refractive index. The results are shown in Table 6:

TABLE 6

| Example | Thermoplastic | Method | 7 day release |
|---|---|---|---|
| 4 | 5% Sylvatac ® RE 98 | Additive in Epon ® 828, premixed | 91% |
| 9 | 5% Sylvares ® TP 96 | Additive in Curing Agent, premixed | 82% |
| 14 | 5% Arotac ® 100 | Additive in Epon ® 828-Epodil ® 746, premixed | 85% |
| 18 | 5% Sylvatac ® RE 98 | Additive in Epon ® 828, added first | 85% |
| 19 | 5% Sylvatac ® RE 98 | Additive in Epon ® 828, Curing Agent added first | 77% |

Example 20

35.1 g of Curing Agent and 4.9 g of Uni-tac® 70 were combined and vigorously mixed at 85° C. until a clear homogenous mixture formed.

500 g of −6/+10 mesh urea granules were charged to a rotating drum mixer, heated to 80-85° C., and maintained at this temperature. 2.31 g of the Curing Agent-Uni-tac® 70 mixture prepared above was mixed with 3.30 g of EPON® 828, and the mixture was immediately added to the urea granules. Agitation was continued for 15 minutes at which point the mixing and addition of the polymer components was repeated. The agitation was continued for 15 minutes until the granules were free flowing. The total coating was 2 percent by weight of the coated urea, and the Uni-tac® 70 was 5 percent by weight of the coating.

To determine the controlled release properties of the coated urea products of Examples 7 and 20, 10 g of the coated urea products were dispersed in 90 g of water and stored at 38° C. for 7 days. The urea that had released from the granules was determined by quantifying the urea in the water phase by refractive index. The results are shown in Table 7:

TABLE 7

| Example | Thermoplastic | Thermoplastic Carrier | 7 day release |
|---------|---------------|----------------------|---------------|
| 7       | 5% Uni-tac ® 70 | EPON ® 828         | 91%           |
| 20      | 5% Uni-tac ® 70 | Curing Agent       | 85%           |

The invention can be embodied in other forms without departing from the spirit or essential attributes thereof. Reference should therefore be had to the following claims, rather than to the foregoing specification to determine the scope of the invention.

We claim:

1. A moisture barrier coating comprising the reaction product of:
   A. at least one polyglycidyl ether resin, and
   B. at least one epoxy curing agent comprising amines
   and further comprising at least one amorphous thermoplastic material that is nonreactive with A and with B, and that forms a homogeneous mixture with at least one of A or B.

2. The composition of claim 1 wherein the thermoplastic material is chosen from the group consisting of hydrocarbon resins, rosin based materials, polyterpene based materials, copolymers thereof, and mixtures thereof.

3. The composition of claim 2 wherein the thermoplastic material comprises hydrocarbon resins.

4. The composition of claim 2 wherein the thermoplastic material comprises rosin based materials.

5. The composition of claim 2 wherein the thermoplastic material comprises polyterpene based materials.

6. The composition of claim 1 wherein the thermoplastic material is present at from about 1 percent to about 50 percent by weight of the moisture barrier coating.

7. The composition of claim 1 further comprising a glycidyl ether containing reactive diluent.

8. A controlled release fertilizer comprising:
   A. a central core containing water soluble plant nutrients
   B. a moisture barrier coating completely enveloping the central core, said moisture barrier coating comprising the reaction product of:
      i. at least one polyglycidyl ether resin, and
      ii. at least one epoxy curing agent comprising amines
   and further comprising at least one amorphous thermoplastic material that is nonreactive with A and with B, and that forms a homogeneous mixture with at least one of A or B.

9. The composition of claim 8 wherein the moisture barrier coating is present at from about 1 percent to about 10 percent by weight of the controlled release fertilizer.

10. The composition of claim 8 wherein a sealant is present at from about 0.2 percent to about 2 percent by weight of the controlled release fertilizer.

11. A method for the production of a controlled release fertilizer, said method consisting essentially of
   A. the provision of fertilizer granules
   B. heating the granules with agitation
   C. applying a coating comprising at least one polyglycidyl ether resin, at least one epoxy curing agent comprising amines, and at least one nonreactive thermoplastic material to the heated fertilizer granules, and
   D. continuing agitation and heating until the polyglycidyl ether resin and epoxy curing agent containing the thermoplastic material have formed a substantially uniform coating on the fertilizer particles, and have reacted to form a polymer.

12. The method of claim 11 wherein a sealant is applied to the coated fertilizer particles and the coated particles are cooled with agitation.

13. The method of claim 11 wherein the thermoplastic material is preadded to the polyglycidyl ether resin.

14. The method of claim 11 wherein the thermoplastic material is preadded to the epoxy curing agent.

15. A moisture barrier coating system comprising:
   A. at least one polyglycidyl ether resin, and
   B. at least one epoxy curing agent comprising amines
   and further comprising at least one amorphous thermoplastic material that is nonreactive with A and with B, and that forms a homogeneous mixture with at least one of A or B.

16. The system of claim 15 wherein the thermoplastic material is chosen from the group consisting of hydrocarbon resins, rosin based materials, polyterpene based materials, copolymers thereof, and mixtures thereof.

17. The system of claim 16 wherein the thermoplastic material comprises hydrocarbon resins.

18. The system of claim 16 wherein the thermoplastic material comprises rosin based materials.

19. The system of claim 16 wherein the thermoplastic material comprises polyterpene based materials.

20. The system of claim 15 wherein the thermoplastic material is present at from about 1 percent to about 50 percent by weight of the moisture barrier coating resulting from the reaction of the system components.

21. The system of claim 15 further comprising a glycidyl ether containing reactive diluent.

* * * * *